Jan. 11, 1927.
H. WOM
1,613,777
SANDALWOOD BURNER
Filed Oct. 21, 1925
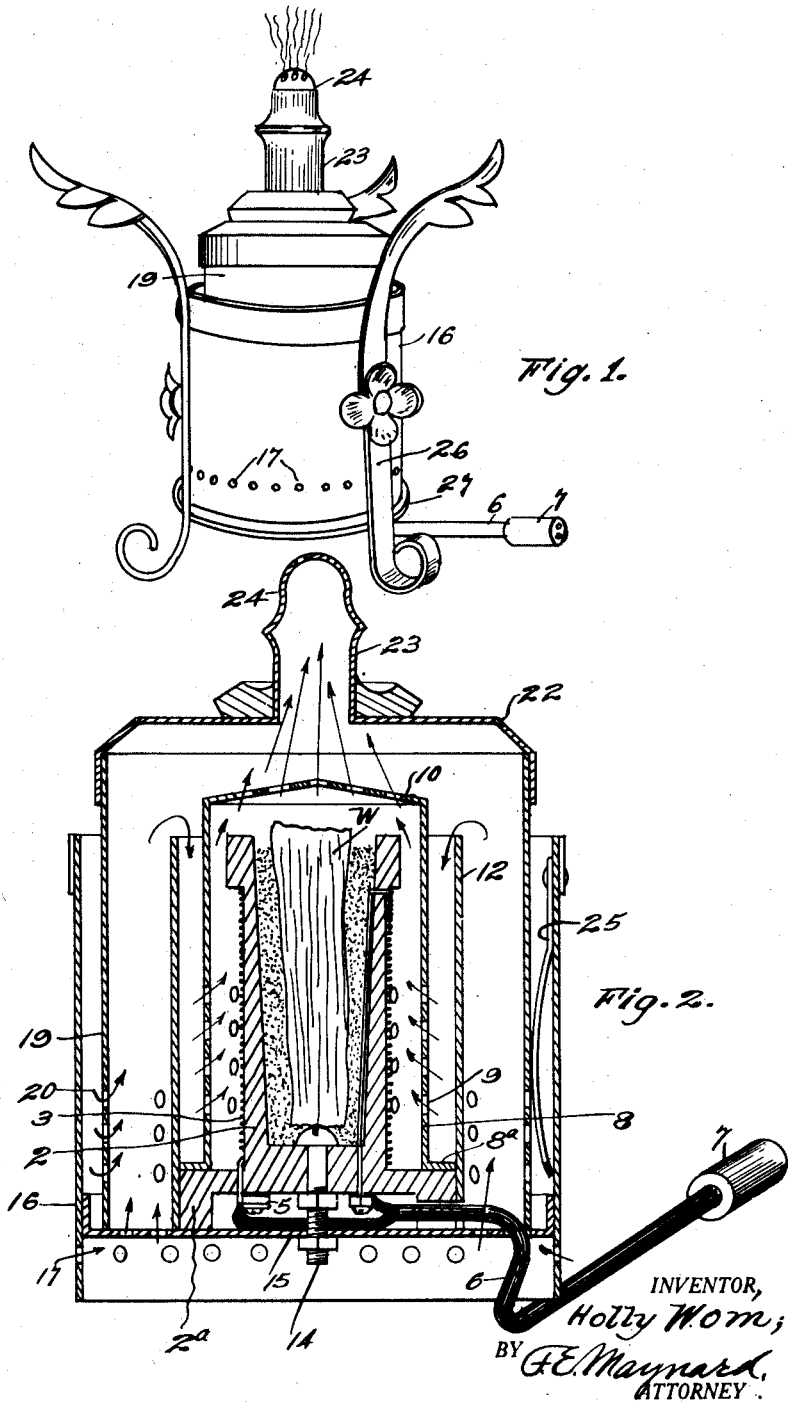
INVENTOR,
Holly Wom;
BY G. E. Maynard,
ATTORNEY.

Patented Jan. 11, 1927.

1,613,777

UNITED STATES PATENT OFFICE.

HOLLY WOM, OF WHITTIER, CALIFORNIA.

SANDALWOOD BURNER.

Application filed October 21, 1925. Serial No. 63,970.

This invention relates to incense burners and more especially to an apparatus for volatilizing sandalwood.

An object is to provide a flameless, incense wood oven operative by short and intermittent applications of electric current made effective by its heating action on a porcelain or other equivalent pot and a powder or dust bed therein enveloping the wood block to be distilled for its aromatic gases.

Other objects and advantages will be made manifest in the following specification of an embodiment of the invention here illustrated, it being understood that modification, variations and adaptations may be resorted to within the spirit and scope of the invention.

Figure 1 is a perspective of the device.
Figure 2 is a central vertical section.

The apparatus shown includes a central vessel or pot 2 of non-conductive, fire-resistant property, such as porcelain, having a heating coil 3 of wire whose terminals are attached to binding posts 5 from which runs a two wire, electric cord 6 having a suitable connector 7 for a service cord.

This pot 2 has a recessed, flanged bottom 2ª on which is set an inner air well 8 having its sides perforated at 9 to let air in toward the naked heating coil 3. The well 8 has a perforated outlet dome 10 above the top of the pot 2, which latter is charged with a fine powder or dust, preferably of "ung leaves" in which a block of sandalwood W is nearly covered.

The lower end of the well 8 is outwardly flanged at 8ª and is removably retained in place by a surrounding down-draft conduit 12 fitting around the base 2ª of the pot and so spaced from the well 8 as to allow for down draft of air thereto. The dome is higher than the conduit so as to be easily grasped for removal to enable replenishment of the incense wood at occasional periods.

The base 2ª is bolted at 14 to a shelf or plate 15 having a housing 16 perforated at 17 for air inlet to holes 18 in the shelf and which are outwardly of the conduit 12.

To prevent the housing 16 from being made too warm by heat radiated from the heating units, an inner jacket or shell 19 is placed between the housing and the conduit 8; the lower portion of the jacket being apertured at 20 to allow an outside downdraft and an inside updraft to the top of the shell, which latter is closed by a cap 22.

The cap has a chimney 23 with a venting nozzle or tip 24.

The shell or jacket 19 is centered and removably held in place by guide springs 25 secured at spaced positions around and in the housing 16.

The conduit 12 has a snug fit on the base so as to remain associated therewith.

The above apparatus is adapted to be mounted in any suitable, ornate frame 26, here having a disc bottom 27 to support the burner structure.

From use of the apparatus it is found that it is necessary to turn on the heating current only for somewhat less than one minute in order to heat up the pot, the powder bed and the block of wood to effect a discharge of aromatic fumes for a period of about one and one-half hours.

What is claimed is:

1. An incense burner including a fire-resistant container, and a bed of powder to embed a body to be volatilized; the container having an electrically energized heating coil wound thereabout for heating the container and the powder content and said container being disposed in upright position to form a deep pot for the powder and having an open top mouth for the ready insertion of the body into the powder.

2. An incense burner having a pot provided with an electric heating coil, a housing enclosing the pot, and a vent chimney for fumes from the pot.

3. An incense burner having a pot provided with an electric heating coil, a housing enclosing the pot, and connection current means to air-cool the housing from radiated heat of the unit; said means including a series of concentric flue walls spaced within the housing.

4. An incense burner including a pot having a heating coil, an air well for passage and escape of air around the pot, a conduit around the well and leading air to its bottom, an outside housing, an intermediate jacket, and a raised bottom in the housing.

5. A ventilated casing enclosing an incense holding pot having a bed of powder for the implanting of a fragrant body, and means for electrically heating the pot to cause distillation of the body.

HOLLY WOM.